US012638120B2

(12) United States Patent
Wang et al.

(10) Patent No.: US 12,638,120 B2
(45) Date of Patent: May 26, 2026

(54) POOL HOSE AIR EVACUATION MODULE

(71) Applicant: SPLASH POOL & SPA, INC., Ningbo (CN)

(72) Inventors: Huaiping Wang, Ningbo City (CN); Paul Lambourn, Johannesburg (ZA); Michael Richard Tregoning, Evendale (ZA)

(73) Assignee: SPLASH POOL & SPA, INC., Ningbo (CN)

( * ) Notice: Subject to any disclaimer, the term of this patent is extended or adjusted under 35 U.S.C. 154(b) by 66 days.

(21) Appl. No.: 18/893,129

(22) Filed: Sep. 23, 2024

(65) Prior Publication Data

US 2025/0102097 A1 Mar. 27, 2025

Related U.S. Application Data

(60) Provisional application No. 63/584,564, filed on Sep. 22, 2023.

(51) Int. Cl.
*F16L 55/07* (2006.01)
*E04H 4/16* (2006.01)

(52) U.S. Cl.
CPC ............ *F16L 55/07* (2013.01); *E04H 4/1645* (2013.01); *E04H 4/1672* (2013.01)

(58) Field of Classification Search
CPC ....... F16L 55/07; E04H 4/1672; E04H 4/1645
See application file for complete search history.

(56) References Cited

U.S. PATENT DOCUMENTS

| | | | | | |
|---|---|---|---|---|---|
| 716,650 | A | * | 12/1902 | Wheeler | F03B 13/00 |
| | | | | | 415/75 |
| 3,322,281 | A | * | 5/1967 | Gulick | F15B 21/041 |
| | | | | | 210/136 |
| 3,355,021 | A | * | 11/1967 | Jones | F25B 43/003 |
| | | | | | 210/446 |
| 3,750,001 | A | * | 7/1973 | McCloskey | G05D 22/02 |
| | | | | | 290/43 |
| 4,067,812 | A | * | 1/1978 | Drori | B01D 29/33 |
| | | | | | 210/310 |
| 4,178,956 | A | * | 12/1979 | Fillman | F16L 55/07 |
| | | | | | 137/302 |
| 4,790,344 | A | | 12/1988 | Chauvier et al. | |
| 4,808,081 | A | | 2/1989 | Finley | |

(Continued)

*Primary Examiner* — Craig M Schneider
*Assistant Examiner* — Christopher D Ballman
(74) *Attorney, Agent, or Firm* — ALLEN, DYER, DOPPELT + GILCHRIST, P.A.

(57) ABSTRACT

A pool hose air evacuation module includes a cover having an upstream connector, and a downstream connector. The cover includes a primary inlet port proximate the upstream connector and a secondary discharge port proximate the downstream connector. The module includes a main conduit, a primary conduit in fluid communication with the primary inlet port and the downstream connector, and a primary impeller mounted within the primary conduit that is config-ured to be driven by a pool water flow through the primary conduit when the valve is in a closed position. The module also includes a secondary conduit in fluid communication with the upstream conduit and the secondary discharge port, and a secondary impeller is mounted within the secondary conduit that is configured to be driven by the primary impeller to remove air from the pool hose.

20 Claims, 4 Drawing Sheets

(56) References Cited

U.S. PATENT DOCUMENTS

| | | | | |
|---|---|---|---|---|
| 6,098,228 | A * | 8/2000 | Chang | E04H 4/1663 |
| | | | | 137/624.14 |
| 6,460,564 | B1 * | 10/2002 | Rief | F16K 31/5284 |
| | | | | 137/625.46 |
| 7,284,565 | B2 * | 10/2007 | Sebor | G05D 7/0173 |
| | | | | 137/527 |
| 8,092,675 | B2 * | 1/2012 | Kennedy | E04H 4/12 |
| | | | | 204/194 |
| 9,163,421 | B2 * | 10/2015 | Van Der Meijden | |
| | | | | E04H 4/1672 |
| 9,605,496 | B2 * | 3/2017 | Kenworthy | F16L 55/07 |
| 11,473,327 | B2 * | 10/2022 | Huang | E04H 4/1654 |
| 2008/0250581 | A1 * | 10/2008 | Henkin | E04H 4/1645 |
| | | | | 210/741 |
| 2011/0226361 | A1 | 9/2011 | Van Der Meijden et al. | |
| 2012/0110727 | A1 * | 5/2012 | Uy | E04H 4/148 |
| | | | | 4/494 |
| 2013/0319916 | A1 * | 12/2013 | Hamza | E04H 4/14 |
| | | | | 210/90 |

* cited by examiner

POOL HOSE AIR EVACUATION MODULE

RELATED APPLICATIONS

This application claims priority to U.S. Provisional Application Ser. No. 63/584,564 filed on Sep. 22, 2023, the contents of which are herein incorporated by reference in their entirety.

FIELD

The present invention relates to the field of pool cleaning equipment, and more particularly, to a pool hose air evacuation module for automatically purging air from a pool hose connected to a suction connection of a pool recirculation system.

BACKGROUND

Automated suction pool cleaners, also known as suction-side pool cleaners, are designed to use the suction created by the filtration system of the pool to move around the pool and clean debris from the floor, walls, and sometimes even the waterline. Such pool cleaners connect via a flexible pool hose (or vacuum hose) to either a water suction or water return connection of the pool filtration system. However, when air gets into the vacuum hose of a pool cleaner, several problems can arise that affect its efficiency and performance.

The main problem is a loss of suction power. Pool vacuums rely on a continuous flow of water to maintain suction, and air in the hose interrupts this flow. This causes the pool cleaner to be less effective at picking up debris, as it cannot maintain proper suction to pull dirt and debris into the filter system. Also, when air enters the pool pump, it can cause a phenomenon called cavitation. This occurs when air bubbles form in the pump, leading to vibrations, noise, and potential damage to the internal components of the pump. Prolonged cavitation can cause significant wear and tear on the pump, reducing its lifespan and potentially leading to costly repairs or replacements.

Air in the vacuum hose can also cause the cleaner to move erratically or stall. It may stop moving altogether or follow an irregular pattern that misses certain areas of the pool. This results in inefficient cleaning, leaving parts of the pool dirty or requiring multiple cleaning cycles to achieve satisfactory results. In particular, air pockets in the hose can interrupt the flow of water through the filtration system. The filtration system relies on a steady flow to properly filter out debris and maintain water quality. This can reduce the efficiency of the filtration, leading to cloudy or dirty water and potentially necessitating more frequent filter cleanings or replacements.

To address air in the vacuum hose, users are advised to manually purge the air from the hose prior to connection to the suction connection. This may include holding an end of the hose over a return connection and allowing water flow therefrom to drive air out the other end of the hose. However, this can be both awkward and time consuming, and many users will not adequately purge the hose as a result.

Accordingly, there is a need in the art for an improved system to remove air from the pool hose that is efficient and easy for the user.

SUMMARY

A hose air evacuation module is disclosed. The module includes a main cover having a downstream connector configured to be connected to a portion of a pool hose that is in communication with a pool pump, and a secondary discharge port separate from the downstream connector. The module also includes a rear cover having an upstream connector configured to be connected to a portion of the pool hose that is in communication with a pool cleaner, and a primary inlet port separate from the upstream connector. In addition, the module includes a main conduit coupling the upstream connector and the downstream connector, and a valve positioned within the main conduit configured to move between a closed position and an open position to selectively block and allow flow therebetween.

A primary conduit within the main cover is in fluid communication with the primary inlet port and the downstream connector, and a primary impeller is mounted within the primary conduit and configured to be driven by a pool water flow through the primary conduit when the valve is in the closed position. A primary gear is also coupled to the primary impeller. A secondary conduit within the main cover is in fluid communication with the upstream conduit and the secondary discharge port, and a secondary impeller is mounted within the secondary conduit. A secondary gear is coupled to the secondary impeller and configured to be driven by the primary gear to rotate the secondary impeller to remove air from the pool hose and pool cleaner. The module may also include an idler gear positioned to be driven by the primary gear, which in turn drives the secondary gear.

The valve may be configured to move to the open position after a designated time period to allow the pool water to be suctioned through the main conduit between the upstream connector and the downstream connector. The valve may be a butterfly valve. The module may include a valve controller coupled to the valve that is configured to control moving the valve between the closed position and the open position. The valve controller may be a spring-loaded timer charged by closing the valve, a geared timer, or an electronic timer.

In a particular aspect, the valve may be moved from the closed position to the open position based on a difference in mechanical load of air versus pool water passing through the secondary conduit. The valve may also be configured to be moved manually between the closed position and the open position. The valve is configured to remain in the closed position until substantially all the air within the pool hose and pool cleaner has been removed before the valve is moved to the open position. When the valve is in the open position, this substantially ceases the pool water flow through the primary conduit and stops rotation of the primary impeller and the secondary impeller.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It is an object of the present invention to provide a hose air evacuation module operable to automatically purge air from a pool hose when connected to a suction connection of the pool recirculation system.

Figure 1:
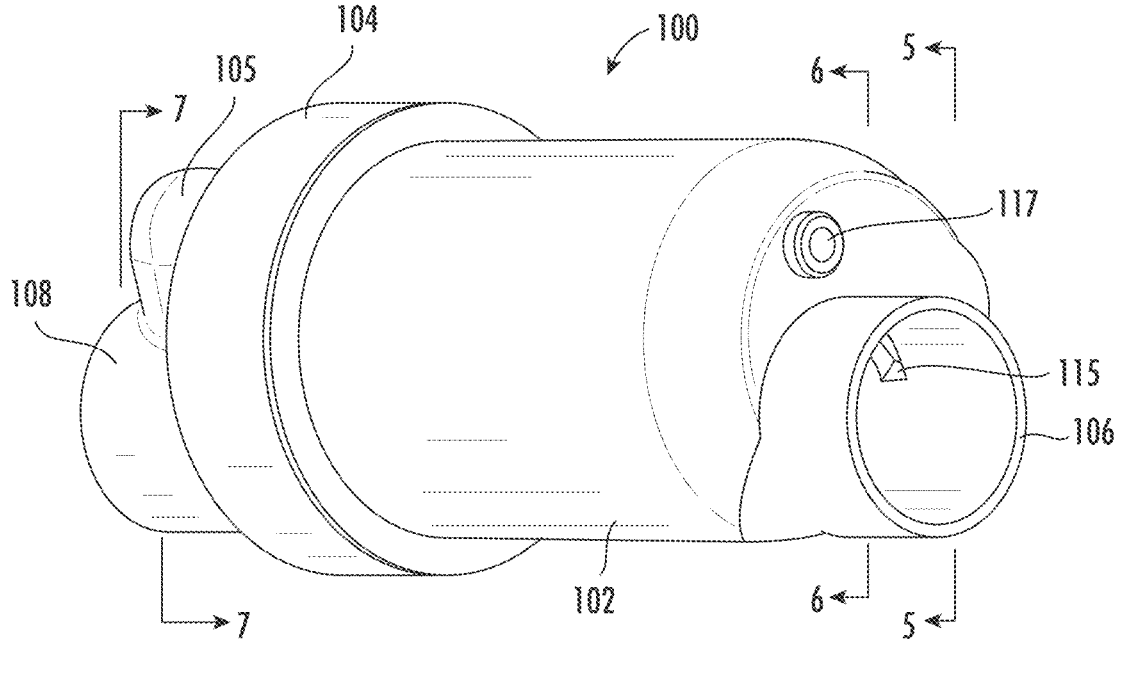
FIG. 1 is a perspective view of a hose air evacuation module in which various aspects of the disclosure may be implemented.

Referring now to FIG. 1, according to a particular aspect of the present invention, a hose air evacuation module (hereinafter referred to as the "module") is disclosed and generally designated 100. The module 100 is configured to be coupled inline between a pool cleaner and a pool pump. The module 100 includes a main cover 102 and a rear cover 104. The main cover 102 includes a downstream connector 106 that is configured to be connected to a portion of the pool hose that is in communication with the pool pump. The rear cover 104 includes an upstream connector 108 that is configured to be coupled to a portion of the pool hose connected to the pool cleaner. Accordingly, a direction of the water flow is configured to be from the pool cleaner to the upstream connector 108, through the module 100, out the downstream connector 106, and to the pool pump.

A primary outlet port 115 is visible in FIG. 1 looking inside the downstream connector 106 into the main cover 102. The primary outlet port 115 is discussed in detail below. A secondary outlet port 117 is positioned to discharge through the main cover 102.

Figure 2:
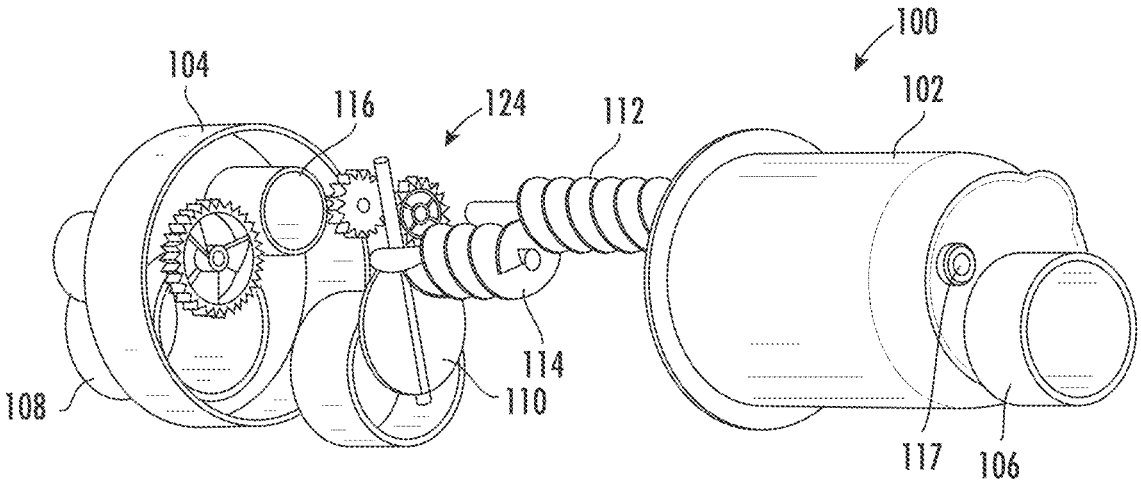
FIG. 2 is a front perspective exploded view of the module of FIG. 1.

Referring now to FIG. 2, various internal components are shown in a front perspective exploded view of the module 100. The module 100 includes a primary impeller 112 and a secondary impeller 114 mounted within the main cover 102. A transmission 124 within the rear cover 104 is engaged with both the primary impeller 112 and the secondary impeller 114. A valve 110 within the main cover 102 is configured to move between a closed position and an open position to selectively block and allow flow therebetween. A butterfly valve is shown as an exemplary valve 110 but as those of ordinary skill in the art can appreciate, any type of blocking element that can be opened and closed may be used.

The module 100 may include a valve controller 105 mounted to the rear cover 104 that is configured to control the valve 110 inside the module 100. The valve controller 105 is configured to control the amount of time the valve blocks the water flow through module 100 as explained below. The valve controller 105 may comprise a sensor to determine a difference in mechanical load of air versus water passing through the secondary conduit 122. As those of ordinary skill in the art can appreciate, various mechanisms may be employed for the valve controller 105, such as a spring-loaded timer charged by closing the valve, a geared timer, or an electronic timer, for example. The valve 110 may also be moved manually between the closed position and the open position in a particular aspect.

Figure 3:
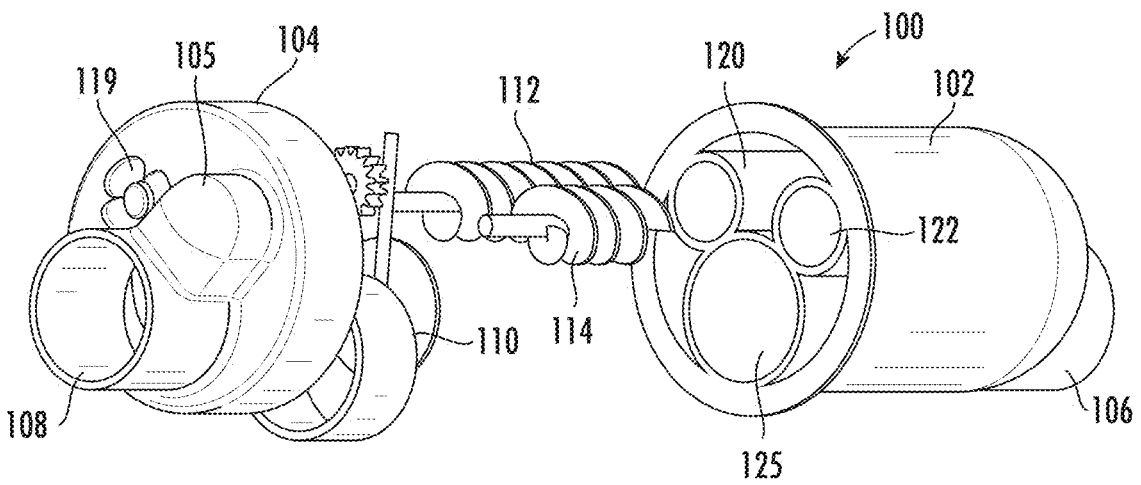
FIG. 3 is a rear perspective exploded view of the module.

The primary impeller 112 fits into a primary conduit 120 within the main cover 102 as shown in FIG. 3. The primary conduit 120 includes a primary inlet port 119 for pool water to enter. A downstream end of the primary conduit 120 exits to the primary outlet port 115, which is in fluid communication with the downstream connector 106. Similarly, the secondary impeller 114 fits into a secondary conduit adjacent to the primary conduit 120. A main conduit 125 passes through the main cover 120 and connects the upstream connector 108 to the downstream connector 106. The main conduit 125 may have a larger cross-sectional area than either the primary conduit 120 or the secondary conduit 122.

Figure 4:
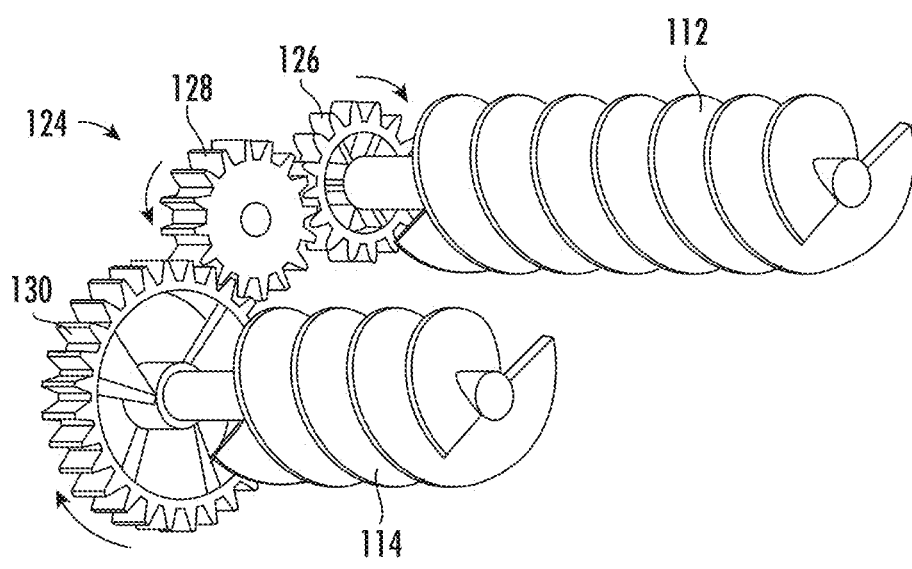
FIG. 4 is a perspective view of a transmission of the module.

The primary impeller 112 and the secondary impeller 114 are rotatably mounted and coupled via a primary gear 126 and a secondary gear 130, respectively, of the transmission 124, as shown in FIG. 4. An idler gear 128 is between the primary gear 126 and the secondary gear 130 to force the secondary gear 130 to rotate, which may rotate in the same direction as the primary gear 126. Also, the secondary gear 130 may be configured to rotate in an opposite direction as the primary gear 126 depending on which direction it is desired for the flow through the secondary conduit 122.

Figure 5:
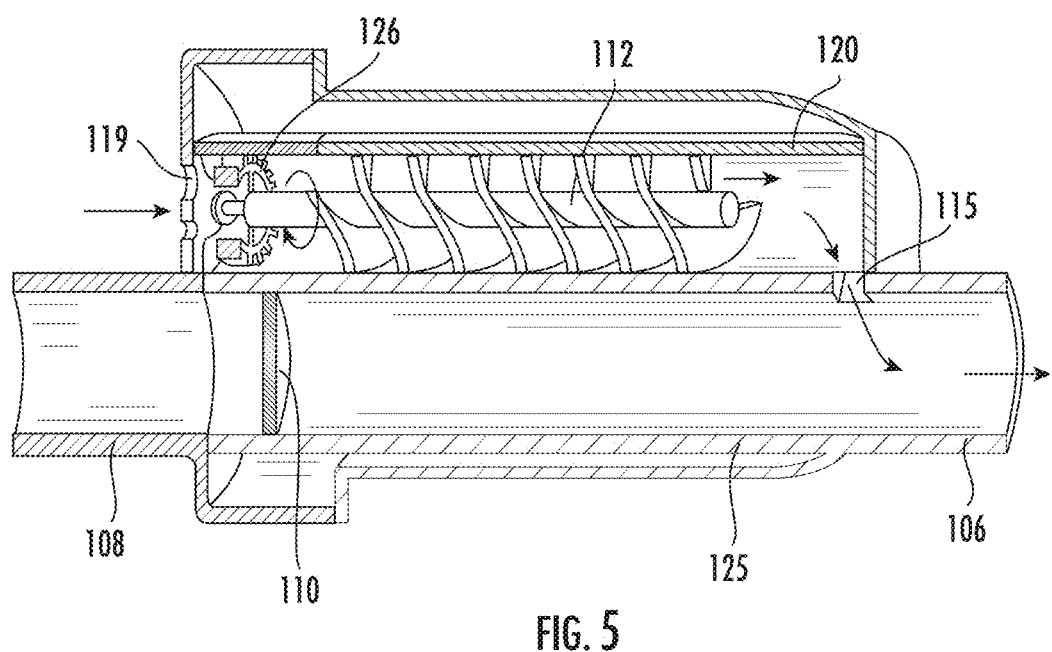
FIG. 5 is a sectional view taken along line 5-5 of FIG. 1.

In operation, the downstream connector 106 is connected to the portion of the pool hose that is in communication with the pool pump and the upstream connector 108 is connected to the portion of the pool hose connected to the pool cleaner. The valve 110 is initially positioned in the closed position to block flow through the main conduit 125 as shown in FIGS. 5 and 6.

With the main conduit 125 blocked, suction is applied to the module 100 by starting the pool pump, for example, which generates a water flow through the primary conduit 120. In particular, pool water is drawn into the primary inlet 119 and through the primary conduit 120 to the primary outlet 115, which is in communication with the downstream connector 106. This water flow through the primary conduit 120 causes the primary impeller 112 to rotate in response to the water flow, as shown in FIG. 5.

Figure 6:
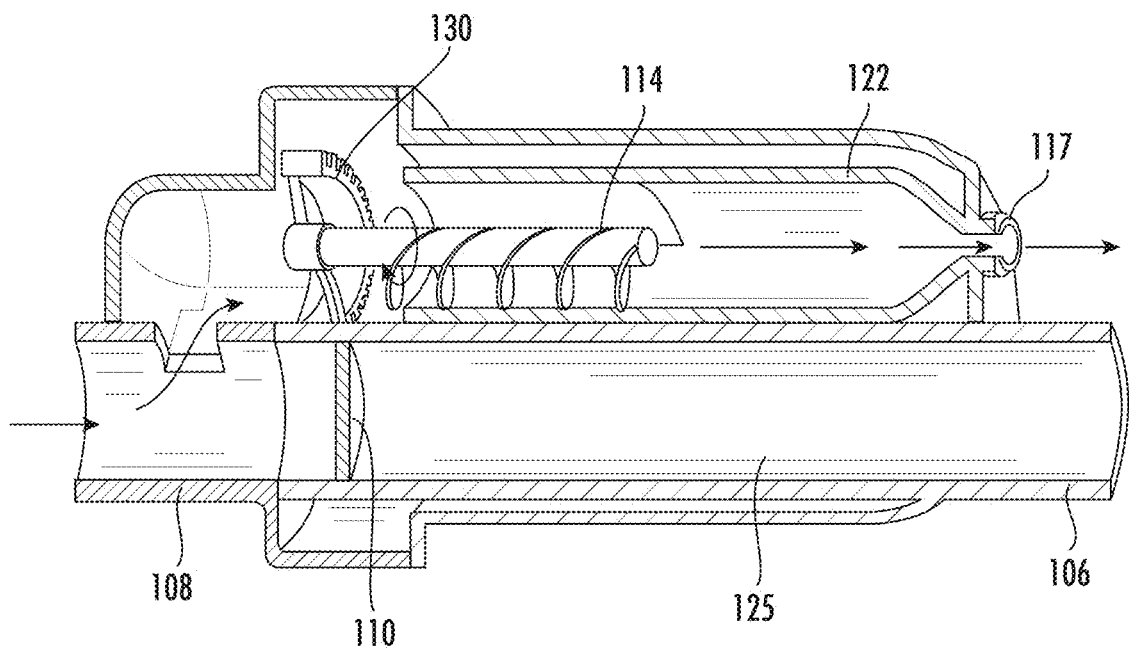
FIG. 6 is a sectional view taken along line 6-6 of FIG. 1.

As the primary impeller 112 rotates, the primary gear 126 rotates the idler gear 128, which in turn drives the secondary impeller 114, as shown in FIG. 6. Advantageously, the rotational speed of the secondary impeller 114 may be decreased and torque increased relative to the primary impeller 112 using gear size changes between the gears of the transmission 124, or vice versa. The rotation of the secondary impeller 114 generates a suction on the upstream connector 108, drawing air (and water) out of that portion of the pool hose connected to the pool cleaner through the secondary conduit 122, and out of the secondary outlet port 117.

Alternatively, the rotation of the secondary impeller 114 may be configured through gearing to cause the water flow to flow through the secondary conduit 122 in the opposite direction as the primary conduit 120. This may also be accomplished by adjusting the pitch of the secondary impeller 114 to cause the flow in the secondary conduit 122 to be opposite to that of the primary conduit 120. In this aspect, suction is generated on the secondary outlet port 117 by the secondary impeller 114, drawing water into the secondary conduit 122, and forcing water out through the upstream connector 108 and through the hose to expel air within the hose and pool cleaner.

Figure 7:
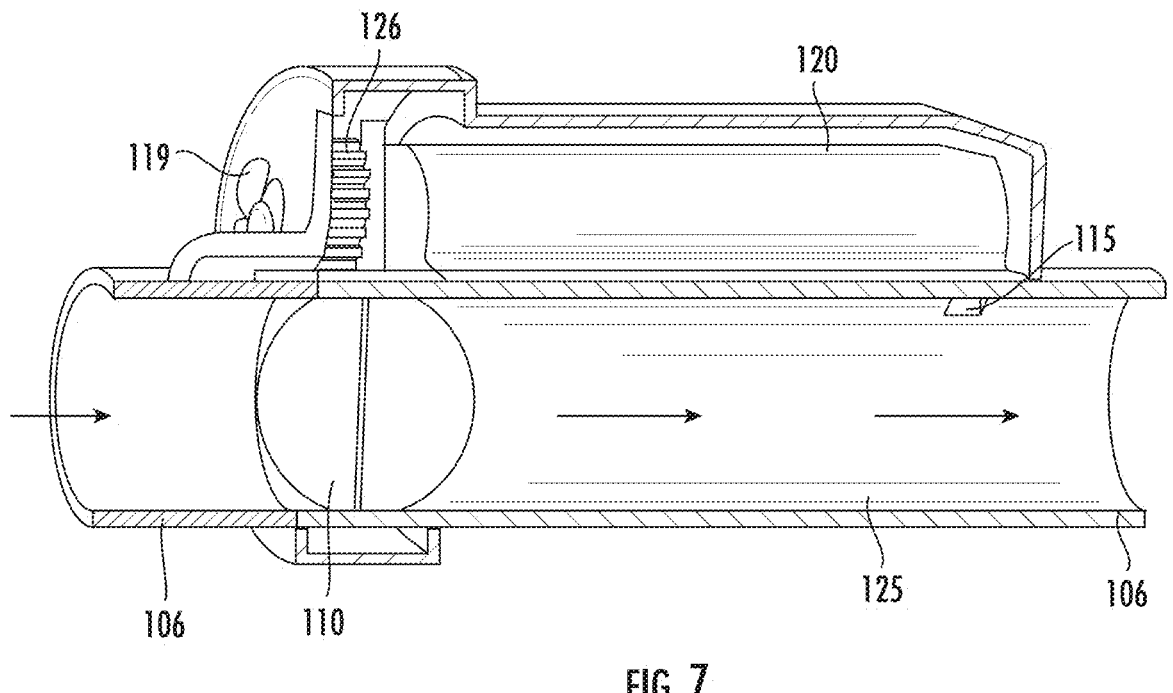
FIG. 7 is a sectional view taken along line 7-7 of FIG. 1.

The valve 110 is moved to the open position, as shown in FIG. 7, after a designated time period. The time period that the valve 110 remains closed is long enough so that all air within the portion of the pool hose connected to the pool equipment has been removed before the valve 110 is moved to the open position. The movement of the valve 110 to the open position, which may be controlled by the valve controller 105, allows the water to be suctioned through the main conduit 125 between the upstream connector 108 and the downstream connector 106. When the valve 110 is in the open position, this effectively ceases the pool water flow through the primary conduit 120 and stops rotation of the primary impeller 112 and the secondary impeller 114. This in turn provides the required suction to the pool equipment to function normally.

Preferably, the time period set by the valve controller 105 is selected to ensure that substantially all trapped air has been evacuated from the portion of the pool hose connected to the pool cleaner. A fixed time period can be used, for example, that may be determined experimentally to be sufficient for a given pool hose length and pool pump flow rate. Alternately, the valve controller 105 may have a user adjustable time period initially set by the user based on local parameters. In another aspect, the valve controller 105 may automatically adjust the time period based on mechanically or electronically sensed conditions. For example, the valve controller 105 may trigger opening of the valve 110 based on a difference in mechanical load of air versus water passing through the secondary conduit 122.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pool hose air evacuation module comprising:
   a main cover having a downstream connector configured to be connected to a portion of a pool hose that is in communication with a pool pump, and a secondary discharge port separate from the downstream connector;
   a rear cover having an upstream connector configured to be connected to a portion of the pool hose that is in communication with a pool cleaner, and a primary inlet port separate from the upstream connector;
   a main conduit coupling the upstream connector and the downstream connector;
   a valve positioned within the main conduit configured to move between a closed position and an open position to selectively block and allow flow therebetween;
   a primary conduit within the main cover in fluid communication with the primary inlet port and the downstream connector;
   a primary impeller mounted within the primary conduit and configured to be driven by a pool water flow through the primary conduit when the valve is in the closed position;
   a primary gear coupled to the primary impeller;
   a secondary conduit within the main cover in fluid communication with the upstream conduit and the secondary discharge port;
   a secondary impeller mounted within the secondary conduit; and
   a secondary gear coupled to the secondary impeller and configured to be driven by the primary gear to rotate the secondary impeller.

2. The pool hose air evacuation module of claim 1, wherein the valve is configured to move to the open position after a designated time period to allow the pool water to be suctioned through the main conduit between the upstream connector and the downstream connector.

3. The pool hose air evacuation module of claim 1, further comprising an idler gear positioned to be driven by the primary gear, which in turn drives the secondary gear.

4. The pool hose air evacuation module of claim 1, wherein the valve comprises a butterfly valve.

5. The pool hose air evacuation module of claim 1, further comprising a valve controller coupled to the valve configured to control moving the valve between the closed position.

6. The pool hose air evacuation module of claim 5, wherein the valve controller comprises one of a spring-loaded timer charged by closing the valve, a geared timer, or an electronic timer.

7. The pool hose air evacuation module of claim 1, wherein the valve is configured to be moved manually between the closed position and the open position.

8. The pool hose evacuation module of claim 1, wherein the valve is configured to remain in the closed position until substantially all the air within the pool hose connected to the has been removed before the valve is moved to the open position.

9. The pool hose evacuation module of claim 1, wherein when the valve is in the open position, this substantially ceases the pool water flow through the primary conduit and stops rotation of the primary impeller and the secondary impeller.

10. The pool hose evacuation module of claim 1, wherein the valve is moved from the closed position to the open position based on a difference in mechanical load of air versus pool water passing through the secondary conduit.

11. A pool hose air evacuation module comprising:
    a main cover having a downstream connector configured to be connected to a portion of a pool hose connected to a pool pump, and a secondary discharge port separate from the downstream connector;
    a rear cover having an upstream connector configured to be coupled to a portion of the pool hose connected to a pool cleaner, and a primary inlet port separate from the upstream connector;
    a main conduit coupling the upstream connector and the downstream connector;
    a valve positioned within the main conduit configured to move between a closed position and an open position to selectively block and allow flow therebetween;
    a primary conduit within the main cover in fluid communication with the primary inlet port and the downstream connector;
    a primary impeller mounted within the primary conduit and configured to be driven by a pool water flow through the primary conduit when the valve is in the closed position;
    a secondary conduit within the main cover in fluid communication with the upstream conduit and the secondary discharge port; and
    a secondary impeller mounted within the secondary conduit;
    wherein the secondary impeller is configured to be driven by the primary impeller.

12. The pool hose evacuation module of claim 11, further comprising a primary gear coupled to the primary impeller.

13. The pool hose evacuation module of claim 12, further comprising a secondary gear coupled to the secondary impeller and configured to be driven by the primary gear.

14. The pool hose air evacuation module of claim 13, further comprising an idler gear positioned to be driven by the primary gear, which in turn drives the secondary gear.

15. The pool hose air evacuation module of claim 14, wherein the valve comprises a butterfly valve.

16. The pool hose air evacuation module of claim 11, wherein the main conduit comprises a larger cross-sectional area than either the primary conduit or the secondary conduit.

17. The pool hose air evacuation module of claim 11, further comprising a valve controller, wherein the valve controller comprises one of a spring-loaded timer charged by closing the valve, a geared timer, or an electronic timer.

18. A pool hose air evacuation module comprising:

a cover having an upstream connector configured to be coupled to a portion of a pool hose connected to a pool cleaner, and a downstream connector configured to be coupled to a portion of the pool hose connected to a pool pump, wherein the cover comprises a primary inlet port proximate the upstream connector and a secondary discharge port proximate the downstream connector;

a main conduit within the cover coupling the upstream connector and the downstream connector;

a valve positioned within the main conduit configured to move between a closed position and an open position to selectively block and allow flow therebetween;

a primary conduit within the cover in fluid communication with the primary inlet port and the downstream connector;

a primary impeller mounted within the primary conduit and configured to be driven by a pool water flow through the primary conduit when the valve is in the closed position;

a secondary conduit within the cover in fluid communication with the upstream conduit and the secondary discharge port; and a secondary impeller mounted within the secondary conduit configured to be driven by the primary impeller.

19. The pool hose air evacuation module of claim 18, further comprising a transmission coupling the primary impeller to the secondary impeller.

20. The pool hose air evacuation module of claim 19, further comprising a valve controller coupled to the valve configured to control moving the valve between the closed position.

\* \* \* \* \*